United States Patent [19]
Soldo et al.

[11] Patent Number: 5,954,310
[45] Date of Patent: Sep. 21, 1999

[54] APPARATUS AND METHOD FOR POSITIONING A PAYLOAD ABOUT MULTIPLE AXES

[75] Inventors: Monnett H. Soldo; David A. Soldo, both of Redwood City; Scott Barclay, Cupertino, all of Calif.

[73] Assignee: Autonomous Effects, Inc., Redwood Shores, Calif.

[21] Appl. No.: 08/943,500

[22] Filed: Oct. 3, 1997

[51] Int. Cl.⁶ ........................................... F16M 1/00
[52] U.S. Cl. ........................................... 248/660; 248/550
[58] Field of Search ........................ 248/278.1, 660, 248/664, 550; 396/419, 428, 529

[56] References Cited

U.S. PATENT DOCUMENTS

| | | | |
|---|---|---|---|
| 3,603,545 | 9/1971 | Boniface | 396/428 |
| 3,791,713 | 2/1974 | Mackay | 359/430 |
| 3,824,001 | 7/1974 | Rosenberg | 359/840 |
| 4,224,515 | 9/1980 | Terrell | 250/231 |
| 4,364,035 | 12/1982 | Kirsch | 340/710 |
| 4,653,709 | 3/1987 | Paldino | 248/278.1 |
| 4,918,713 | 4/1990 | Honda | 378/99 |
| 4,920,260 | 4/1990 | Victor | 250/221 |
| 5,028,997 | 7/1991 | Elberbaum | 396/419 |
| 5,111,288 | 5/1992 | Blackshear | 358/108 |
| 5,463,432 | 10/1995 | Kahn | 352/243 |
| 5,802,412 | 9/1998 | Kahn | 396/428 |

*Primary Examiner*—Ramon O. Ramirez
*Assistant Examiner*—Anita M. King
*Attorney, Agent, or Firm*—Gray Cary Ware & Freidenrich

[57] ABSTRACT

An angular positioning apparatus is disclosed for rotating a housing mounted within a supporting structure to any angular position relative to a sphere along a plurality of orthogonal axes that intersect at approximately the center of mass of the housing. The supporting structure may be comprised of supporting members having annular concave surfaces that match the contour of the housing and thus maintain the housing within the supporting structure. The housing may be rotated about the axes by an actuator assembly and drive mechanism contacting the wall of the housing. Because the axes of rotation intersect the center of mass of the housing, or, if a payload is attached to the housing, the center of mass of the combination of the housing and payload, the housing can be positioned quickly, accurately, and with a minimum force. The housing is stably maintained within the supporting structure, regardless of the housing's orientation in three-dimensional space, by ensuring that the distance between the center of the housing and the center of mass of the payload-housing combination is less than the inner radius of the supporting structure where the supporting structure contacts the surface of the housing.

24 Claims, 6 Drawing Sheets

APPARATUS AND METHOD FOR POSITIONING A PAYLOAD ABOUT MULTIPLE AXES

BACKGROUND OF THE INVENTION

This invention relates generally to angular positioning apparatus and methods, and more particularly to an apparatus and method for angularly positioning a payload, such as a camera, about multiple axes of orientation.

Many types of systems may use angular positioning, i.e., angular orientation, apparatus. For example, an antenna may be angularly positioned about multiple axes so that it can point to any orientation in three-dimensional space and can be moved to quickly and accurately track objects moving across the sky. A narrow beam detector may be precisely angularly positioned about multiple axes to detect a narrow beam transmitted from a source. A laser may be angularly positioned about multiple axes so that its beam is accurately aimed to desired locations.

In addition, it is desirable to be able to angularly position a payload on a moving platform, such as a camera which may be used to transmit images from a moving vehicle as it focuses on an object in space. The camera may keep objects within view by, for example, being positioned by an angular positioning apparatus that compensates for multi-dimensional movements of the vehicle. The angular positioning apparatus may do this by moving the camera in an appropriate direction relative to the motion between the vehicle and the object. If the vehicle bounces upward, the camera could be angled downward to keep the object within view.

Conventional positioning systems may only move a device in two directions, e.g., the pan and tilt directions, but few can do so accurately or quickly, and still fewer move a device in a third dimension, e.g., the roll direction. A pan direction is a direction corresponding to the direction of yaw for a vehicle in a horizontal plane. It is a side-to-side motion about a vertical axis through the vehicle, and may include a sweeping motion that describes an arc in a horizontal plane. A tilt direction is a direction corresponding to the direction of pitch. It is a rocking motion about a horizontal axis orthogonal to the direction of motion, such as the up-and-down vertical movement of the front of a ship, and may describe an arc in a vertical plane. A roll direction is a direction corresponding to an axis through the vehicle in the direction it is moving.

If the device being positioned is ground based, an angular positioning apparatus may only need to move the device in pan and tilt directions, i.e. about two rotational axes. However, if either the device or a target that the device is tracking is moving, the apparatus may have to rotate the device about three axes, such as pan, tilt, and roll axes.

Conventional angular positioning systems use various different hardware systems to move a payload. A first kind of system may have an arm that is pivotally attached, for example, to a horizontal plate. By pivoting the arm in a vertical plane about a point intersecting the plate, the end of the arm can trace a circular or semi-circular arc in the vertical plane. The endpoints of the arc may lie in the horizontal plate. This could move a payload attached to the end of the arm in a tilt direction. The horizontal plate could in turn be rotated about a line perpendicular to it and intersecting it at the pivot point. By rotating the plate about this line, the payload can trace a circular arc in a plane parallel to the horizontal plate. The payload could thus be moved in a pan direction. By pivoting the arm about the point and rotating the plate about the line, the end of the arm can trace a path anywhere along a spherical or semi-spherical surface whose center is the pivot point and whose radius is the length of the arm.

A second kind of conventional angular positioning system uses gimbals to position a payload. The gimbal may have a vertical support member perpendicularly mounted at one end to a plate lying in a horizontal plane and attached at its other end to the lowest point of, for example, a U-shaped member. The structure may resemble the letter "Y." A cross-member may be rotatably attached to the end points of the U-shaped member. A payload attached to the cross-member could be panned by rotating the vertical member about an axis parallel to the vertical member, and the payload could be tilted by rotating the cross member about the endpoints of the U-shaped member.

For several reasons the first kind of conventional angular positioning system cannot quickly and easily position its payload about multiple axes. The arm becomes increasingly unstable when, for example, it is pivoted so that its angle with respect to the horizontal plate decreases (i.e., as the payload gets closer to the horizontal plate). When this happens the payload's center of mass is no longer supported by the arm, and an increasing force must be applied to either move or support the payload. Thus, any force used to tilt the arm becomes non-uniform and depends on the amount the arm is already tilted. This non-uniform force makes it difficult to quickly and accurately move the arm, and thus the payload, to a desired position. The system may also need locking mechanisms to maintain the arm at this otherwise unstable position. Complex motors and locking mechanisms also typically make these conventional systems expensive.

These difficulties are exacerbated when, for example, a payload, such as a camera, is to be positioned along a roll axis, as when the camera is mounted on a moving vehicle. To compensate for any roll of the vehicle the conventional positioning system would have to rotate the entire horizontal plate with the attached arm along an axis parallel to the vehicle's line of movement. The structure of this system is unwieldy, often heavy, and typically unstable. For reasons similar to those discussed above, the system would require a large force, having a torque dependent on the position of the payload, to rotate the horizontal plate and arm in a roll direction. The system would also require locking mechanisms, in addition to those needed to maintain the payload in a tilt direction, to maintain the payload in otherwise unstable positions along the roll axis.

The second kind of angular positioning system also does not easily rotate any attached payload about more than two axes. For example, the entire system may be attached to another gimbal that rotates the system about a roll axis. Like the first kind of conventional system, this two-layered system may be unwieldy, heavy, and unstable, and a large, non-uniform force may be required to move the payload as the payload's center of mass is moved about a roll axis. The system may also require locking mechanisms to maintain the payload in an otherwise unstable position. Therefore, it is desirable to angularly position and maintain a payload about multiple axes extending in a desired direction using a uniform and minimal force.

Another problem with conventional angular positioning systems is that they may require a large amount of clear space around them for a payload attached to the end of the arm to be moved to the limit of its angular, i.e., pan, tilt, and roll, range. For example, in the first type of angular positioning system the arm and any mounted payload may define an arc whose length is equal to the combined length of the arm and mounted payload. Thus, for example, to sweep through a 180° arc in a tilt direction (e.g., in a vertical plane), the angular positioning system may need a clear distance equal to the length of this arc both in front of it and behind it. This requirement makes it difficult to move the positioning system and payload into tight areas. For similar reasons, the second kind of angular positioning system may also require a clear space around it. It is desirable to angularly position a payload using a minimum clearance so that the payload can be positioned in tight areas. Thus, there is a need for a system and method for angularly positioning a payload which avoids these and other problems of known systems and methods, and it is to this end that the present invention is directed.

SUMMARY OF THE INVENTION

The invention provides an angular positioning apparatus and method that solve the foregoing and other problems of known angular positioning apparatus. The angular positioning apparatus and method of the invention accurately position a payload about multiple axes of rotation to substantially any position (i.e., orientation) along the surface of a sphere. They can do this using an actuator assembly and drive mechanism that provides a uniform force and uses minimum power.

The invention achieves these advantages, in part, by housing the payload in an easily rotatable housing mounted upon a supporting structure. The housing may be spherical or partially spherical so that the payload may be easily positioned along an infinite number of rotational axes while the center of mass of the housing and payload combination is kept within the radius of the supporting structure where the supporting structure contacts the housing. The center of rotation, defined by an actuator and drive mechanism, which positions the housing, may advantageously be located near the center of mass of the housing and payload combination. Because the center of rotation is near the center of mass, less force is needed to position the housing about the multiple axes of rotation.

According to one aspect of the present invention, the weight of the housing is uniformly distributed about the surface of the supporting structure, whose annular concave surface matches the contour of the housing. The housing is more stably maintained in this supporting structure, which does not require locking or similar mechanisms to maintain the housing in a position within the supporting structure.

In some embodiments of the invention, the payload may be moved to substantially any orientation in three dimensional space by using drive motors that position the housing about three orthogonal axes. The motors may be attached to rollers that contact the housing along, for example, orthogonal planes. The rollers may be driven by small motors that receive commands from a remote computer, a network controller, or any other digital device.

DETAILED DESCRIPTION OF THE PREFERRED EMBODIMENTS

The invention is generally applicable to angular positioning apparatus and methods used, for example, to position a payload, such as a camera, about multiple axes of rotation, and will be described in that context. However, it will be appreciated from the description that follows, that the invention has broader utility to other positioning devices.

Figure 1:
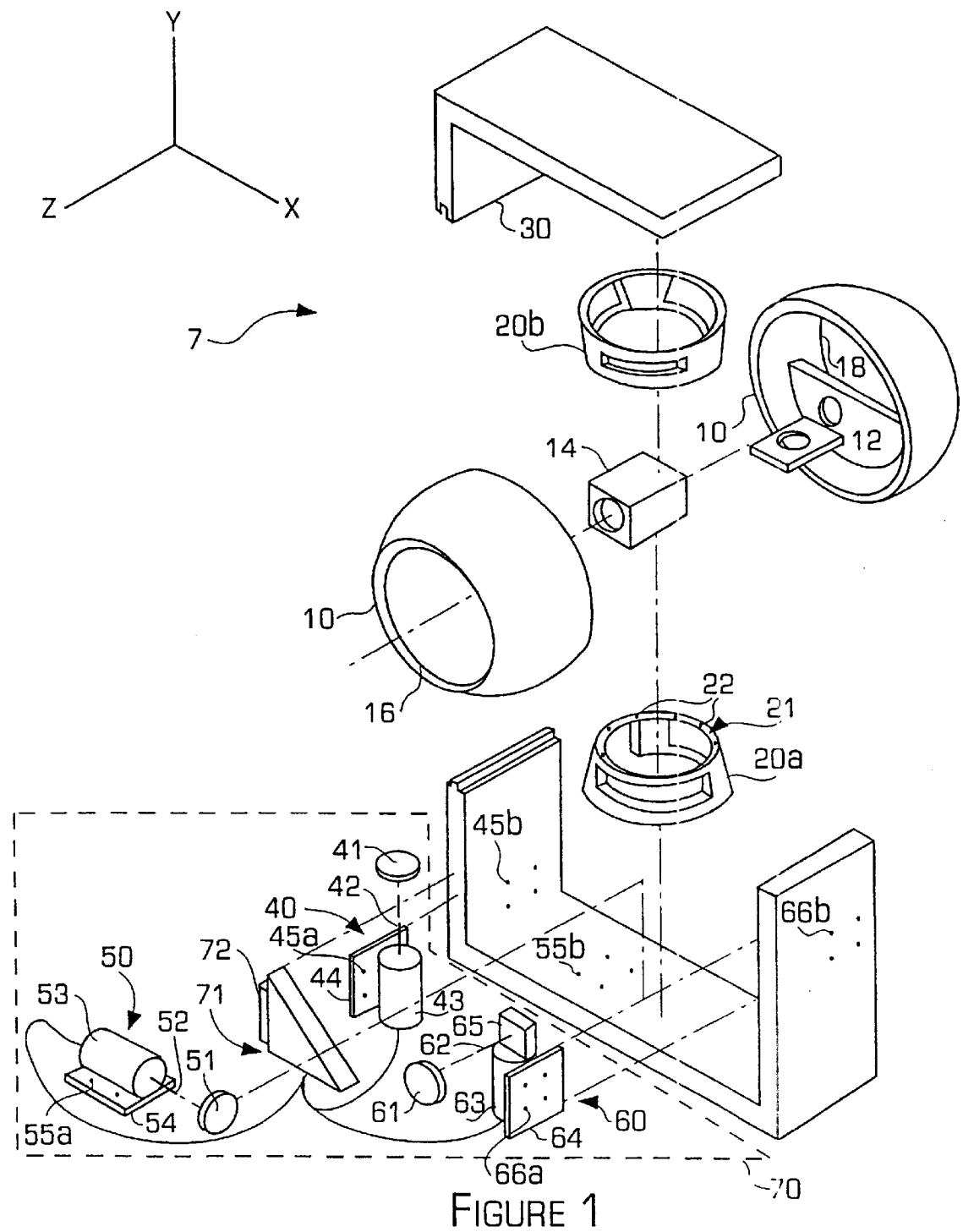
FIG. 1 is an exploded perspective view of a positioning apparatus in accord with the present invention.

FIG. 1 shows a first embodiment of an angular positioning apparatus 7 in accordance with the present invention. The apparatus 7 may comprise a spherical or partially spherical-shaped housing 10, a supporting structure 20 (shown as supporting members 20a–b) for rotatably supporting the housing, an actuator assembly and drive mechanism 70 for rotating the housing within the supporting structure about multiple axes, and a frame 30 for enclosing and mounting the whole apparatus. In the embodiment of FIG. 1, the housing can be rotated about orthogonal axes X, Y, and Z corresponding, as will be described below, to the pan, tilt, and roll directions, respectively, which intersect within the housing at approximately its center of mass. This places the center of rotation of the housing at approximately the housing's center of mass. Preferably, the orthogonal axes intersect as close as possible to the housing's center of mass so that a moment arm between the center of mass and the center of rotation of the housing is as small as possible. This structure reduces the force required to rotate the housing about the rotational axes. Thus, in a preferred embodiment the orthogonal axes intersect at the housing's center of mass. The housing may further comprise a payload mount 12 within the housing for supporting a payload 14 such as a camera. When a payload is mounted in the housing, preferably the orthogonal axes intersect at the center of mass of the payload and housing combination.

As shown in FIG. 1, the housing can be panned within the XZ plane by rotating it about the Y-axis. The housing can be tilted within the YZ plane by rotating it about the X-axis. And the housing can be rolled within the XY plane by rotating it about the Z-axis. By rotating the housing about a combination of the X, Y, and Z axes, the housing can be positioned so that an aperture 16 located on the housing surface can point in any direction (i.e., orientation) in three-dimensional space.

The housing may be any shape that allows it to rotate easily within the supporting structure. The housing may be made of a material suitably strong so that it can support a payload mounted on the payload mount, yet suitably light to ensure that a large force is not needed to move the housing. Suitable materials may include plastics and metals. The surface of the housing may also be smooth to minimize the friction between it and the supporting structure, yet coarse enough to provide sufficient friction between it and the actuator assembly and drive mechanism (discussed below) so that the actuator assembly and drive mechanism can rotate the housing within the supporting structure. The actuator assembly and drive mechanism may rotate the housing within the supporting structure by, for example, using rollers or other devices to engage the surface of the housing. Possible embodiments of the actuator assembly and drive mechanism are discussed in more detail below.

Figure 2:
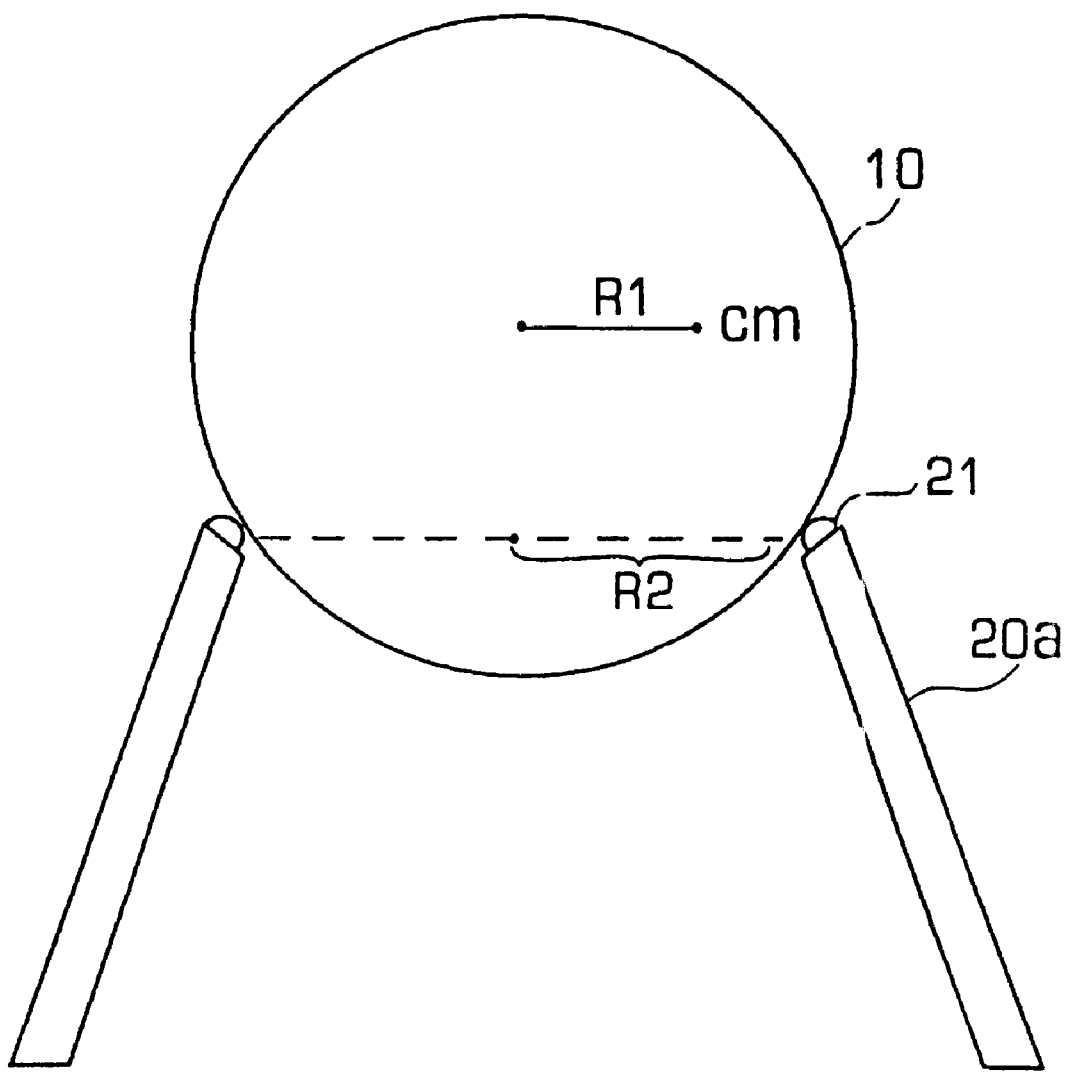
FIG. 2 is a section of one embodiment of a supporting structure for the positioning apparatus of FIG. 1.

The payload mount may be attached to the housing so that the center of mass of any mounted payload is located at approximately the housing's center of mass. Alternatively, the payload mount may be attached to the housing in other orientations, preferably so that the center of mass of the housing and payload combination is located near the center of rotation of the housing and payload combination. In addition, as shown in FIG. 2, the distance between the center of mass and the center of the housing (R1) should be less than the inner radius of the supporting structure where the supporting structure contacts the surface of the housing (R2). This structure ensures that the housing may be positioned to any orientation in three-dimensional space using a minimum and uniform force, and that the housing and payload combination is stable, regardless of its orientation in three-dimensional space.

As shown in FIG. 1, the housing may have an opening 16 so that the payload (e.g., a camera) has an unimpeded view of surrounding objects. Alternatively, the housing or part of the housing could be made of a transparent plastic or other suitable material to give the payload an essentially unimpeded view of its surroundings as the housing is rotated. The housing may also have a rear opening 18 that may be used to connect cables between a payload inside the housing and devices outside the housing, e.g., computer controllers or power supplies. Alternatively, a portion of the housing may be made of suitable material that allows wireless transmission between the payload and external devices, obviating the need for openings to connect the payload to any external devices. Thus, the housing may be a complete sphere.

The supporting structure 20 may comprise a single supporting member 20a or two supporting members 20a, 20b. One supporting member 20a may be used to support the gravitational weight of the housing while allowing the housing to rotate freely to any orientation in three-dimensional space. The supporting member 20a may be strong enough to bear the weight of the housing and any mounted payload. A second supporting member 20b may be oriented with respect to the first supporting member to prevent the housing from being knocked out of the first supporting member. The second supporting member may be located diametrically opposite the first supporting member relative to a plane intersecting the center of the housing. The supporting members may thus be mirror images with respect to the plane. The second supporting member may also be used to secure the housing when the frame is mounted in various positions, such as upside down (see, e.g., FIG. 3b). The supporting structure may have an annular concave surface to match the contour of the housing so that the housing is firmly, yet rotatably supported by the supporting structure, much like a ball and socket configuration. As discussed next, the housing may be rotated on the supporting structure by the actuator assembly and drive mechanism.

The actuator assembly and drive mechanism 70 may comprise an actuator associated with each of the axes about which the housing is moved to orient the housing in three-dimensional space. The actuator and drive assembly may thus have three actuators mounted on the frame 30 and positioned so that each actuator rotates with respect to the frame, a fixed reference, so that the housing is positioned with respect to each rotational axis. For example, a pan actuator 40 may pan the housing within the XZ plane. Additionally, as discussed more fully below, a tilt actuator 50 may tilt the housing within the YZ plane, and a roll actuator 60 may roll the housing within the XY plane.

Figure 5:
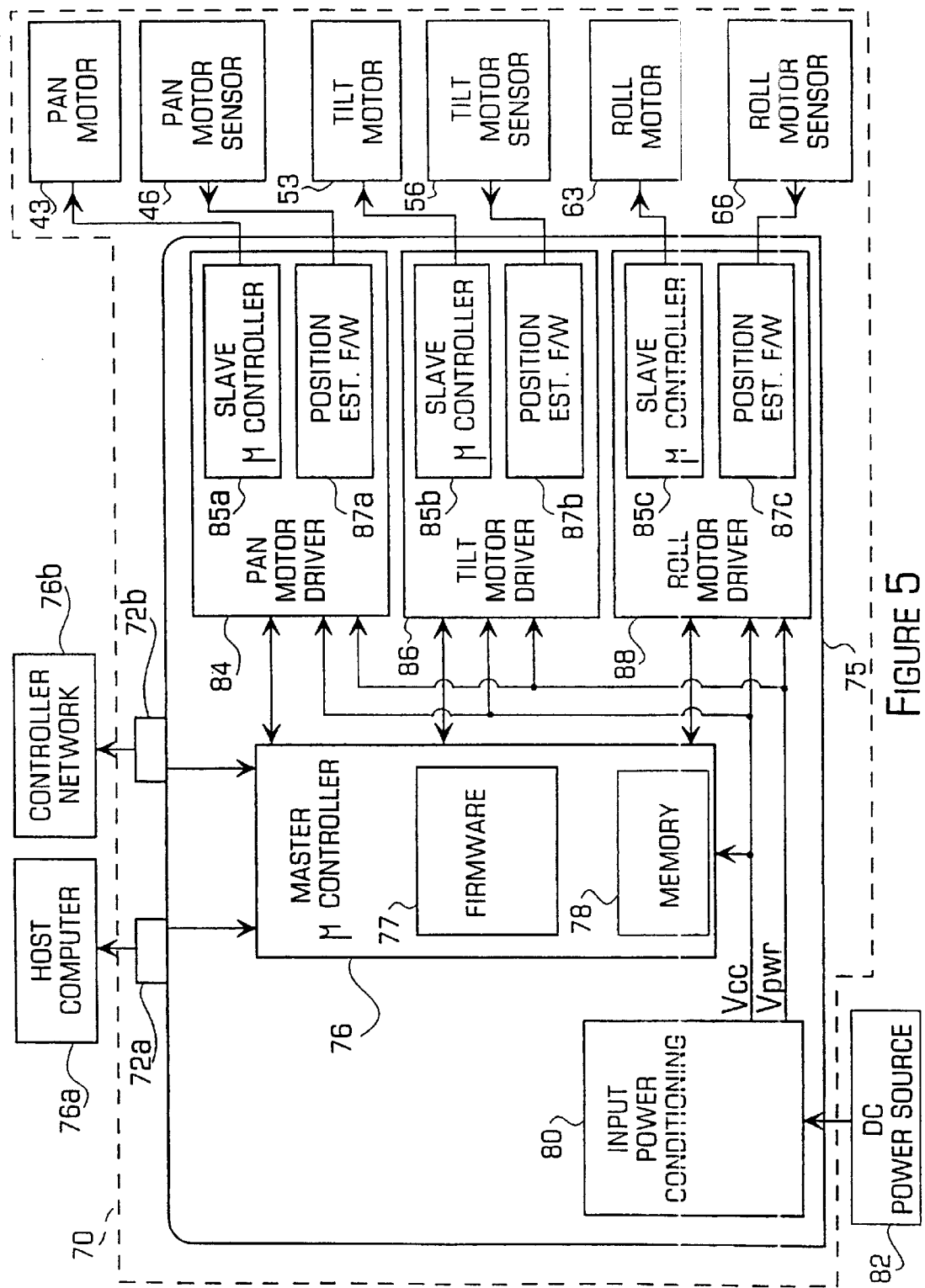
FIG. 5 is a schematic diagram of a first embodiment of a device controller used with either of the embodiments of the present invention.

The pan actuator may comprise a pan roller 41 that contacts the outer surface of the housing to rotate it in a pan direction in the XZ-plane, a pan shaft 42 rigidly and rotatably attached to the center of and in a plane perpendicular to the face of the pan roller, a pan motor 43 for rotating the pan shaft 42, and a pan mount 44 attached to the pan motor and used for mounting the pan actuator to a frame 30 to orient the pan roller with respect to the housing. Preferably, the pan roller is positioned so that the pan axis intersects the center of mass of the housing or, if a payload is mounted on the housing, the center of mass of the housing-payload combination. The pan actuator could alternatively be placed so that the pan roller contacts the inner surface of the housing as when, for example, the pan actuator is placed within the housing as shown in FIG. 5, described below. As shown in FIG. 1, an opaque frame 30 may limit the viewing range of the payload in the pan direction to less than 360° since it would block the payload's view of objects located behind the opaque portions of the frame. As discussed above, the frame may be made of a transparent material to ensure that the payload's view in the pan direction is not impeded, giving the payload a greater viewing range in the pan direction, as well as the tilt direction.

The pan roller may be a circular disc and placed in frictional contact with the housing, and it may impart movement to the housing much as one geared wheel imparts movement to a mated geared wheel. The pan roller may be coated with or made from a material, such as rubber, that allows it to frictionally contact the housing, and thus rotate the housing within the supporting structure. Like a mated geared wheel, the pan roller may rotate the housing in a direction opposite to that in which the pan roller rotates.

The pan roller may be rotated about its center by a pan shaft 42, which in turn may be rotated by a pan motor 43. The pan motor may be a pneumatic motor, a DC motor, a stepping motor, or any kind of device that can uniformly and accurately rotate the pan shaft. The pan motor should be sized to provide sufficient torque so that the pan roller can rotate the housing and any mounted payload to any desired position along the pan axis.

The pan roller may be rigidly fixed in relation to the housing by mounting the pan actuator 40 on a frame 30 using the pan mount 44. The pan mount may be mounted on the frame by aligning holes 45a in the pan mount with holes 45b in the frame and inserting, for example, mounting screws and nuts. As illustrated in FIG. 1, the pan mount may be mounted so that the pan roller is in a plane parallel to the XZ plane, and thus may rotate the housing in a pan direction. The housing could also be rotated in a pan direction by mounting the entire frame on a shaft oriented in the pan direction. This structure would obviate the need for a separate pan actuator mounted to the frame. In addition, this structure would give any mounted payload a full 360° range of view in the pan direction since the housing would not be rotated with respect to the frame, and thus the frame would not come between a line of sight between the payload and an object.

A tilt actuator may be used to orient the housing in a tilt direction. For example, again using the diagram and coordinate system of FIG. 1, a tilt actuator 50 may tilt the housing about the X axis, within the YZ plane. The tilt actuator may comprise a tilt roller 51 that contacts the outer surface of the housing to move it in a tilt direction, a tilt shaft 52 rigidly and rotatably attached to the center of the tilt roller and in a plane perpendicular to the face of the tilt roller, a tilt motor 53 for rotating the tilt shaft, and a tilt mount 54 attached to the tilt motor and used for mounting the tilt actuator to, for example, a frame 30, and thus orienting the tilt roller with respect to the housing. The tilt roller could also be placed so that it contacts the inner surface of he housing by, for example, placing the tilt actuator within the housing.

The tilt roller, tilt shaft, tilt motor, and tilt mount have similar structures and serve similar functions as the pan roller, pan shaft, pan motor, and pan mount, respectively, except that they are used to rotate the housing in a tilt direction. The tilt actuator, however, may be mounted to the frame using holes 55a in the tilt mount and holes 55b in the frame so that the tilt roller may lie in a plane orthogonal to the pan roller. As shown in FIG. 1, this may be accomplished, for example, by mounting the tilt mount in a plane orthogonal to the pan mount. Thus, while the pan actuator may be mounted to frame 30 so that the face of the pan roller 41 is in a plane parallel to the XZ plane, the tilt actuator may be mounted to the frame so that the face of the tilt roller is in a plane parallel to the YZ plane. As with the pan roller, the tilt roller is preferably located so that the tilt axis intersects the center of mass of the housing. If the housing has a payload, the tilt roller may be positioned so that the tilt axis intersects the center of mass of the housing and payload combination.

A roll actuator 60 may roll the housing about the Z-axis, within the XY plane. The roll actuator may comprise a roll roller 61 that contacts the outer surface of the housing to move it in a roll direction, a roll shaft 62 rigidly and rotatably attached to the center of and in a plane perpendicular to the face of the roll roller, a roll motor 63 for rotating the roll shaft about its center axis, and a roll mount 64 attached to the roll motor and used for mounting the roll actuator to, for example, a frame 30, and thus orienting the roll roller with respect to the housing. The roll roller, roll shaft, roll motor, and roll mount have similar structure and serve similar functions to the pan roller, pan shaft, pan motor, and pan mount, respectively, except that they are used to rotate the housing in a roll direction.

The roll actuator may be mounted to the frame by aligning holes 66a in the roll mount and holes 66b in the frame, and inserting, for example, mounting screws and nuts. While the pan actuator may be mounted to a frame so that the face of the pan roller 41 is in a plane parallel to the XZ plane, and the tilt actuator is mounted so that the face of the tilt roller is in a plane parallel to the YZ plane, the roll actuator may be mounted to the frame so that the face of the roll roller is in a plane parallel to the XY plane. This may be accomplished by using a roll adapter 65, which translates the rotation of the roll shaft to a direction parallel to the Z axis. As with pan and tilt rollers, the roll roller could also be placed so that it contacts the inner surface of the housing as, for example, by placing the roll actuator within the surface of the housing.

The roll roller may be located so that the housing is rotated about a roll axis that intersects approximately the center of mass of the housing. If the housing has a payload, the roll shaft may be positioned so that the roll axis intersects at approximately the center of mass of the housing and payload combination. In a preferred embodiment the pan, tilt, and roll axes intersect at one point located at the center of mass of the housing and payload combination.

The pan motor 43, tilt motor 53, and roll motor 63, may comprise any convenient electrical motors, such as DC motors and gearheads. Stepping motors, pneumatic motors, or any devices that can rotate the housing may also be used. As discussed below, the actuator assembly and drive mechanism 70 may receive commands to energize the motors to orient the housing about multiple rotational axes, such as the pan, tilt, and roll axes. The major functional control electronic components of the actuator assembly and drive mechanism will be described below with reference to FIG. 5.

FIG. 2 shows a side sectional view of the housing 10 supported by a frusto-conical supporting member 20a of FIG. 1. The housing rests on the ball bearings 22 located on the bearing race 21. In the embodiment shown in FIG. 1, the supporting structure is comprised of two frusto-conical supporting members 20a, 20b that rotatably support the housing. As discussed below, in relation to FIG. 4, the supporting structure may also comprise one frusto-conical supporting member. The supporting structure may alternatively have other shapes that maintain the housing so that it can be rotated about the orthogonal axes. For example, the supporting structure may be a cylindrical-shaped structure having a first cylindrical-shaped member to support the gravitational weight of the housing, and a second cylindrical-shaped member positioned to secure the housing within the first cylindrical-shaped member, regardless of the structure's orientation in three-dimensional space. The surfaces of the cylindrical-shaped members may be configured to match the contour of the housing and may have an outer diameter greater than the housing's diameter.

As shown in FIG. 1, the bearing race may have a plurality of ball bearings 22 located about its perimeter which contact the housing. The ball bearings may be used to reduce the friction between the supporting structure and the housing and thus allow the housing to rotate freely about the supporting structure. Thus, an actuator assembly and drive mechanism used to position the housing about multiple axes may only need to overcome inertia and the frictional force between the housing and the ball bearings in order to move the housing to any orientation in three-dimensional space. Preferably only a small force may be needed, and the actuator assembly and drive mechanism may comprise small, inexpensive motors.

Figure 3A:
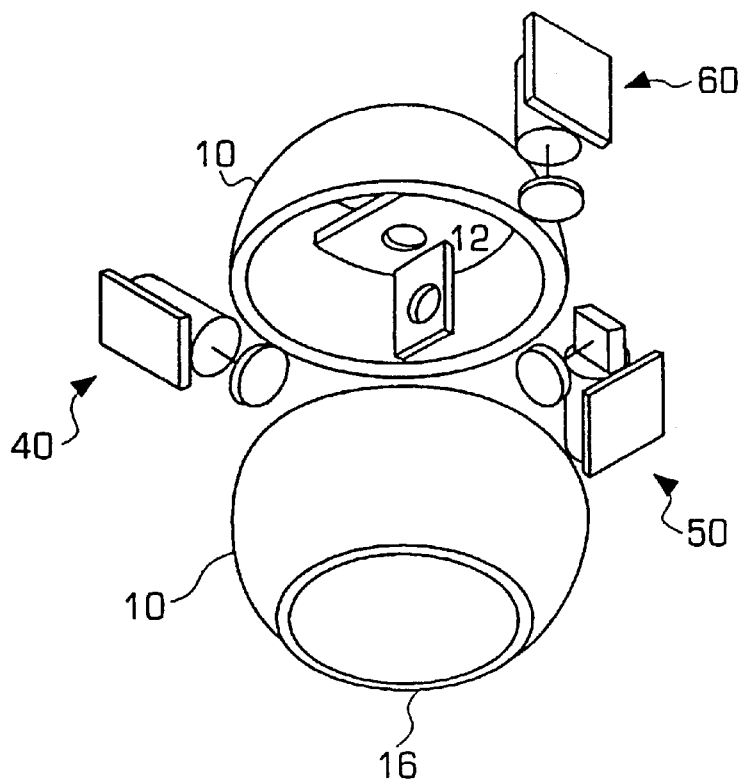
FIG. 3a is a partially exploded perspective view of a first embodiment of the positioning apparatus in accordance with the invention oriented in an upside-down position.
Figure 3B:
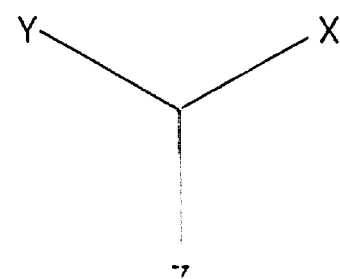
FIG. 3b is a diagram of the fully assembled apparatus of FIG. 3a, mounted in an upside-down position.
Figure 3B:
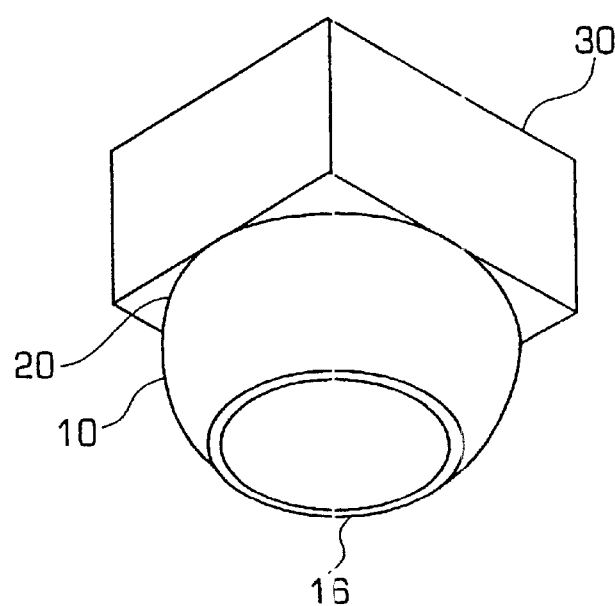

FIG. 3a is a partially exploded perspective of the housing and motor drivers of FIG. 1 oriented in an upside-down configuration, and FIG. 3b is the fully assembled apparatus of FIG. 3a. Like numerals in FIGS. 1, 3a, and 3b refer to like components. The housing may be maintained in the position shown in FIG. 3b by positioning the supporting members at the sides of the housing and angling the supporting members so that the surfaces of the supporting members bear the weight of the housing to maintain the housing in its upside-down position.

Figure 4:
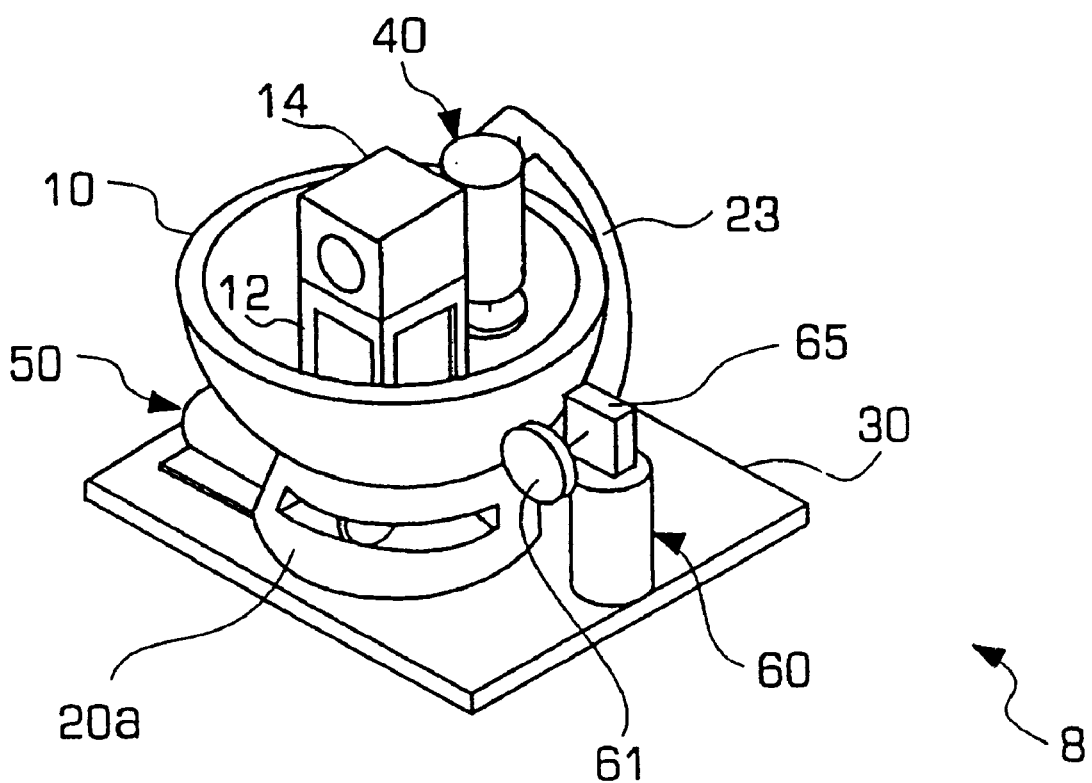
FIG. 4 is a second embodiment of the present invention having a housing shaped as a partial sphere.

FIG. 4 is a diagram of an angular positioning device 8 having a housing 10 that is semi-spherical. Like reference numerals correspond to like components in FIG. 1. Here, the frame 30 is merely a flat plate. This structure allows the payload an essentially unimpeded 360° range of view in the pan direction. In the embodiment of FIG. 4, the housing does not fully enclose the payload. This embodiment may be useful, for example, when the payload must be changed often and only a partial range of rotation in the tilt and roll directions is needed. Here, because only a limited range of rotation in the tilt and roll directions are needed, only a single supporting member 20a is required, the gravitational weight of the housing maintaining the housing within the supporting member. FIG. 4 additionally shows a pan actuator 40 mounted within the housing 10. By mounting the pan actuator within the housing, the positioning device is more compact and can thus be mounted in smaller areas. As shown in FIG. 4, the pan actuator may be positioned relative to the housing so that the pan roller contacts the surface of the housing by mounting the pan actuator to the end of an arm 23, which in turn may be mounted to the frame 30.

The housing may be oriented by the actuator assembly and drive mechanism 70, which may receive commands from a remote device such as a host computer or controller network. For example, a user at a host PC may transmit a command for an angular positioning apparatus to rotate its housing 10° along a pan axis, 50° along a tilt axis, and −5° along a roll axis. The apparatus used to receive these commands and translate them into signals to move the housing accordingly will now be discussed.

FIG. 5 is a diagram of one embodiment of a control system for an actuator assembly and drive mechanism 70. A host computer 76a or network controller 76b may transmit commands to a position controller 75. The position controller may cause the actuator motors to be activated to move the housing to a desired position about rotational axes, such as the pan, tilt, and roll axes. The host computer may transmit commands to the position controller using connector 72a, which may include an RS-232 port. A network controller may issue similar commands to the position controller through a connector 72b, which may include an RS-485 multidrop network port. The position controller processes the commands and transmits electrical signals to the motor drivers, which in turn transmit electrical signals to motors to orient the housing about multiple rotational axes. In the present embodiment the actuator assembly and drive mechanism further comprises a pan motor 43, a tilt motor 53, and a roll motor 63, to rotate the housing about rotational axes, as well as a pan motor sensor 46, a tilt motor sensor 56, and a roll motor sensor 66 used, as discussed below, to determine either each roller's (i.e., the pan roller, tilt roller, and roll roller) motion or the housing's orientation about the rotational axes. An example discussing each component of the position controller and their relationship to each other is given below.

A plurality of sensors, such as a pan motor sensor 46, a tilt motor sensor 56, and a roll motor sensor 66, may be used to transmit signals about the housing's actual position about the rotational axes to the position controller based on either the housing's or each motor's position relative to the rotational axes. By processing these signals, the position controller can more accurately move the housing to a desired position about the rotational axes. The position controller can also transmit other information about the housing, such as its velocity and orientation, back to the computer or network controller using connectors 72a or 72b. The components of the position controller will now be discussed.

The position controller may comprise an input power conditioning device 80, which receives power from an external DC power source 82 and provides filtered output to master microcontroller 76 which receives positioning commands from, e.g., a host computer, and translates these commands into signals recognized by pan, tilt, and roll motor drivers 84, 86, 88, which energize the pan, tilt, and roll motors 43, 53, 63, respectively, to position the housing about the pan, tilt, and roll axes.

The master microcontroller may include firmware 77 for processing the positioning commands. The firmware may then translate these commands into signals recognized and used by a pan motor driver 84, a tilt motor driver 86, and a roll motor driver 88 to position the housing about the coordinate axes. Additionally, the firmware may translate information about the position and velocity of the housing from the motor drivers to generate signals sent to the host computer or network controller about, for example, the housing's position, velocity or other data about the housing's movement about the rotational axes.

The position controller may also include a memory 78 for storing commands and other data before they are processed and transmitted, for example, to the motor drivers, the host computer, or the network controller. The memory may also contain positional information about the housing, such as its present position about the rotational axes and its velocity. This positional information may be used to move the housing to a new position, or it may be transmitted to a host computer or network controller for processing.

The master microcontroller may issue a command to each motor driver 84, 86, 88 to move each motor's associated roller and thus the housing to a desired position about a rotational axis. Each motor driver may then send an electrical signal to its respective motor, to energize the motor thus move the housing about pan, tilt, and roll axes. As discussed below, the motor sensors 46, 56, 66 may determine the distance the housing was moved about each axis and may feed this information back to the motor drivers to accurately position the housing about the rotational axes. Alternatively, the motor sensors may measure motor or motor shaft rotation, and feed this information to the position estimator firmware 87a–c, which may then determine the distance the housing was moved along each axis. This information may be used by the motor drivers to accurately position the housing about the rotational axes.

One method the master microcontroller may use to position the housing to a particular position is to record the present location of the housing along the axes of rotation, and then determine the amount the housing must be moved along each of the rotational axes to reach the desired position. Using this "relative positioning," the master microcontroller may transmit this relative position on each coordinate axis to each of the respective drive motors. Alternatively, the master microcontroller may directly use information about the desired position to move the housing an absolute distance along each coordinate axis.

If the master microcontroller uses relative positioning to move the housing, it may translate the distance the housing must be moved along each coordinate axis to a signal recognizable by the pan, tilt, and roll motor drivers. In some embodiments the master microcontroller may translate a command to move the housing a distance along each axis (e.g., pan, tilt, and roll axis) into a pulse-width-modulated (PWM) digital signal which is transmitted to each of the motor drivers. For example, a command to move the housing 50° (i.e., a destination position) from its present location on the pan axis may require that a PWM digital signal with a width of 10 ms be transmitted to the winding of the pan motor. Similarly, a command to move the housing 100° along the pan axis may translate into a command to transmit a PWM digital signal with a width of 20 ms to the winding of the pan motor. After receiving this destination position, the pan motor driver will generate the PWM digital signal with the required width. Alternatively, the motor drivers may generate other types of signals that may be used to energize the pan, tilt, and roll motor windings, such as amplitude or frequency modulated signals. These and other types of signals are within the scope of the present invention.

The master microcontroller may correlate the distance the housing is to be moved, for example, using a table stored in its memory. A table could also be stored external to the master microcontroller in, for example, a memory located on the motor drivers, and may even be stored external to the position controller itself. Thus, as described more fully below, a host computer may transmit a destination position to the position controller which translates this destination position into an electrical signal and transmits this electrical signal to the motor windings. The motors can then orient the housing to the destination position.

Some embodiments of the invention may use DC motors which use a feedback loop to more accurately position the pan, tilt, and roll rollers and thus the housing about the rotational axes. Other embodiments may use stepping motors, which are cheaper, but do not provide as accurate positioning as do DC motors. Embodiments using each type of motor is discussed below, with the embodiment using DC motors discussed first.

The embodiment of the invention shown in FIG. 5 uses DC motors to orient the housing. As shown in FIG. 5, each motor driver 84, 86, 88 may comprise a slave microcontroller, 85a, 85b, and 85c, respectively, and position estimator firmware 87a, 87b, and 87c, respectively, used to determine the position of the housing about each of the respective rotational axes.

The slave microcontroller may receive data from the master microcontroller corresponding to a command to generate a PWM digital signal. The slave microcontroller may then generate a PWM digital signal as described above and transmit this PWM signal to the winding of, for example, the pan motor. As an example, the master microcontroller may receive a command to rotate the housing 100° about the pan axis. The master microcontroller may translate this command into data recognized by the pan motor driver. Using the firmware 77, the master microcontroller may use a table stored in the memory 78 to translate this command into, for example, the hexadecimal word FF01h, which may be transmitted to the pan slave microcontroller. The pan slave microcontroller may in turn translate this word into a PWM digital signal with a width of 20 ms and transmit this PWM digital signal to the winding of the pan motor to energize the pan motor, and thus rotate the pan roller, which rotates the housing about a pan axis. Similar steps may be used to orient the housing about the tilt and roll axes.

The motor drivers may use feedback to accurately track the position of the housing along the rotational axes. For example, each motor driver may have position estimator firmware 87a–c that may track the orientation of the housing along the coordinate axes. Alternatively, the position estimator firmware may be stored and executed in the master microcontroller. The position estimator firmware may read positional information from sensors 46, 56, 66, and use that information to determine the housing's position with respect to each rotational axis. The position estimator firmware may decode this position and issue a command for the slave microcontroller to increase or decrease the amplitude of the PWM digital signal and to thus continue or stop rotating the housing about a rotational axis. The firmware may issue a command to stop rotating the housing, for example, if the housing has reached its destination position on a respective rotational axis.

The sensors may be optical encoders located near the surface of the housing, and which optically detect unique designs, such as lines or spots on the housing surface, whose positions uniquely determine the location of the housing about each of the rotational axes. Such structures may be used for absolute positioning, when the housing is moved with respect to a fixed position. Alternatively, the sensors may be shaft encoders that output signals which, when decoded by a slave microcontroller, indicates the motion of each shaft (i.e., pan shaft, tilt shaft, and roll shaft) about each of the rotational axes, and therefore indicates the motion of the housing about the rotational axes. Such structures may be used for relative positioning, when each shaft (and thus the housing) is moved a relative position from its present position. Of course the sensors could have other structures that can be used to accurately determine the location of the housing, the shafts, or other components used to precisely position the housing about the axes of rotation.

The following example will illustrate the steps taken by the position controller shown in FIG. 5 The master microcontroller 76 may receive a destination position about the rotational axes from a host computer 76a. The present location of the housing about the rotational axes may be read from the memory of the master microcontroller (the present location may be stored in the memory 78 during system initialization) and used by the firmware 77 to calculate the distance the housing must be rotated about each rotational axis to reach the destination position. The master microcontroller may use a table stored in its memory to translate each distance to a binary code recognizable and translatable by each motor driver. The master microcontroller may transmit the binary code corresponding to the distance the housing must be moved about the pan (i.e. X) axis, for example, to the pan motor driver, the binary code corresponding to the distance the housing must be moved about the tilt (i.e. Y) axis to the tilt motor driver, and the distance the housing must been moved about the roll (i.e. Z) axis to the roll motor driver.

The pan slave microcontroller 85a may translate the binary code that it receives into a PWM digital signal and may transmit this PWM digital signal to the winding of the pan motor 43. The tilt slave microcontroller 85b may translate the binary code that it receives into a PWM digital signal and may transmit this PWM digital signal to the winding of the tilt motor 53. The roll microcontroller 85c may translate the binary code that it receives into a PWM digital signal and may transmit this PWM digital signal to the winding of the roll motor 63.

As the housing is rotated about the rotational axes, the pan motor sensor 46, tilt motor sensor 56, and roll motor sensor 66, may measure the rotation of each motor's shaft. These measurements may be transmitted to the position estimator firmware 87a, 87b, 87c, respectively, to calculate the distance the housing has moved along each rotational axis. When the housing has moved the required distance along a rotational axis, the corresponding position estimator firmware will issue a command to its slave microcontroller to send a 0-amplitude pulse to the respective motor winding, bringing the respective motor to a stop. The master microcontroller may now store the desired position that it received from, e.g., the host computer or network controller, in its memory as the present location. Alternatively, the position estimator firmware 87a–c could transmit directly to the master microcontroller the housing's actual position along the rotational axes received from the motor sensors. The master microcontroller may then transmit this location to a host computer or network controller, if requested.

Figure 6:
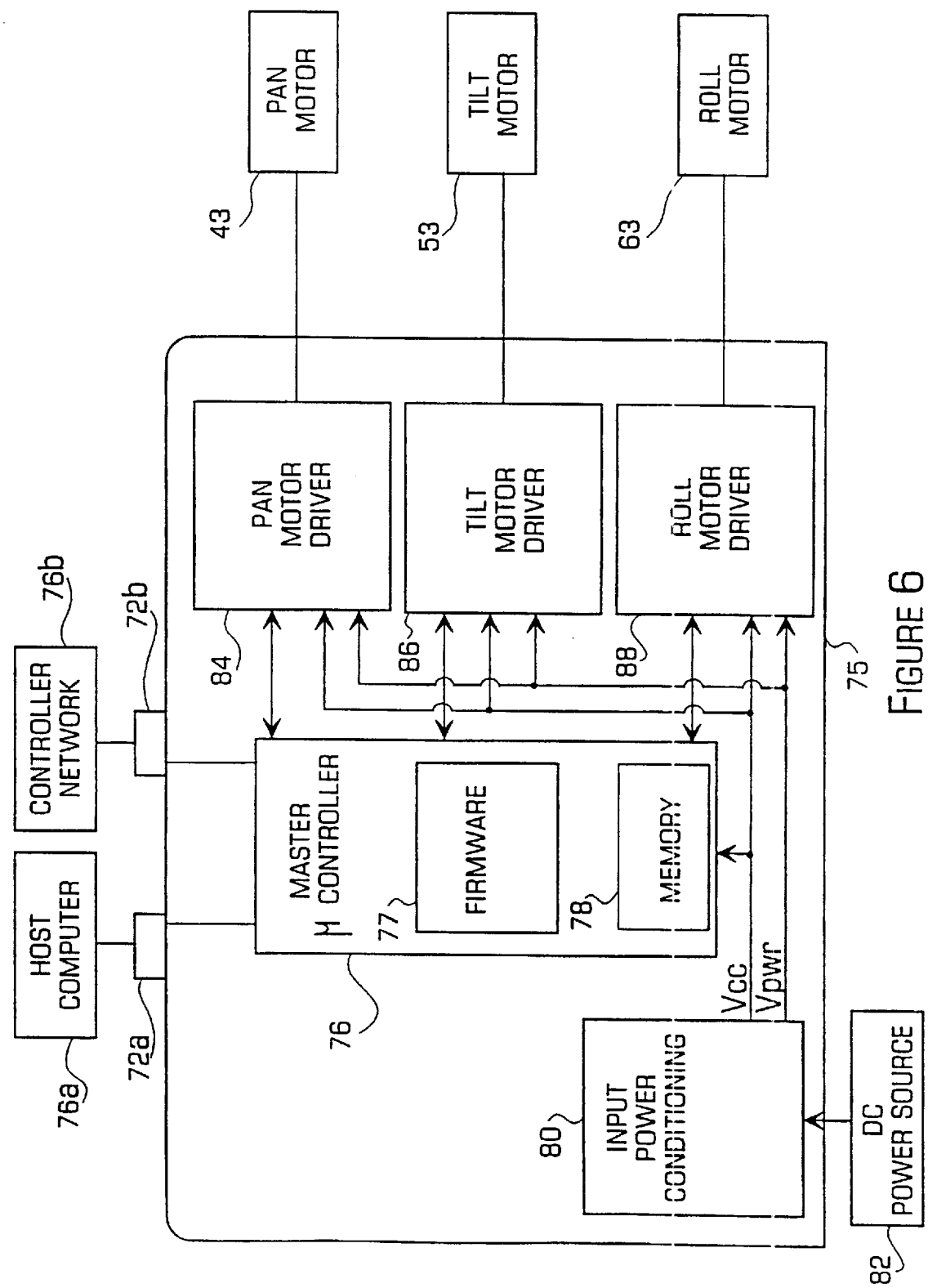
FIG. 6 is a schematic diagram of a second embodiment of a device controller used with either embodiment of the present invention.

FIG. 6 shows another embodiment of a position controller 75 in accordance with the present invention, which uses stepping motors 43, 53, and 63 instead of linearly-controlled DC motors. The components correspond to those components in FIG. 5 having similar reference numerals. If a stepping motor is used, the slave microcontrollers and sensors of FIG. 5 are not required. In some instances, DC motors may be preferred over stepping motors because DC motors have smaller diameters than comparable-sized stepping motors and thus allow for a lighter and more compact system. When stepper motors are used, each motor is activated for the corresponding number of steps required to reach the destination position in each direction, e.g., the pan, tilt, and roll directions. These embodiments may also use tables to correlate distances with a number of steps to move the housing. These steps may be translated by each motor driver 84, 86, 88 into a train of digital pulses corresponding to the number of steps the housing must be rotated about a coordinate axis. The steps taken when using the embodiment shown in FIG. 6 may be similar to those taken with respect to FIG. 5. For embodiments in accordance with FIG. 6, however, no feedback is used.

While the foregoing has been with reference to particular embodiments, it will be appreciated that changes in these embodiments may be made without departing from the principles and the spirit of the invention, the scope of which is defined in the appended claims.

We claim:

1. An apparatus for positioning a payload, comprising: a housing having a hollow spherically shaped contour and adapted to enclose a payload; a supporting structure having a contour to match the contour of the housing in order to rotatably mount the housing; and computer-controlled means for automatically rotating the housing about at least three orthogonal axes that intersect at a point within the housing to orient the housing to a predetermined angular position relative to the point of intersection.

2. The apparatus of claim 1, wherein the axes intersect at approximately a center of mass of the housing when the payload is enclosed in the housing.

3. The apparatus of claim 1, wherein the housing is a partial sphere, and further wherein the supporting structure comprises a supporting member positioned to support the weight of the housing, the supporting member having a surface matching the contour of the housing.

4. The apparatus of claim 1, wherein the supporting structure comprises a first supporting member and a second supporting member located diametrically opposite the first supporting member relative to a plane intersecting the center of the housing, the first and second supporting members each having a surface matching the contour of the housing, the first and second supporting members positioned to maintain the housing within the supporting structure.

5. The apparatus of claim 4, wherein each supporting member has an annular concave surface that matches the contour of the housing and contacts the surface of the housing.

6. The apparatus of claim 5, wherein the surface of each supporting member contacting the surface of the housing has a radius, the radius being larger than the distance between the center of the housing and the center of mass of the housing.

7. The apparatus of claim 5, wherein the surface of each supporting member contacting the surface of the housing has a radius, the radius being larger than the distance between the center of the housing and the center of mass of the housing when the payload is enclosed in the housing.

8. The apparatus of claim 1, wherein the means for rotating comprises an actuator assembly and drive mechanism for rotating the housing about each of the axes, the actuator assembly and drive mechanism being mounted to a frame that supports the supporting structure, and wherein the actuator assembly and drive mechanism comprises a plurality of actuator and drive devices each associated with each of the axes for rotating the housing about each of the axes.

9. The apparatus of claim 8, wherein the actuator assembly and drive mechanism further comprises a controller coupled to each of the actuator and drive devices, the controller communicating commands to each of the actuator and drive devices for positioning the housing about each of the axes, the controller including means for determining a current angular position; means for receiving a signal representing a desired angular position; and means responsive to the determining means and the responsive means for producing the commands to position the housing to the desired angular position.

10. The apparatus of claim 9, wherein the determining means comprises a plurality of sensors for sensing the rotational position of the housing, each sensor being associated with one of the axes, each sensor coupled to an associated motor driver controller, each sensor transmitting to its associated motor driver information about the rotational position of the housing relative to its associated axis.

11. The apparatus of claim 10, wherein each of the actuator and drive devices further comprises a motor having a roller in frictional contact with the surface of the housing for rotating the housing about an associated one of the axes; a plurality of motor drivers, each motor driver associated with one each of the motors, each motor driver communicating positional information between the controller and the motor driver's associated motor to position the housing about one each of the axes.

12. The apparatus of claim 11, wherein each of the motor drivers comprises a motor driver controller for translating the desired angular position about a rotational axis received from the controller to a signal used to energize the motor driver's associated motor to position the housing about one each of the axes.

13. The apparatus of claim 9, wherein the determining means comprises a plurality of sensors for sensing the rotational position of the drive device, each sensor being associated with one of the axes, each sensor coupled to an associated motor driver controller, each sensor transmitting to its associated motor driver information about the rotational position of the drive device relative to its associated axis.

14. The apparatus of claim 13, wherein each of the actuator and drive devices further comprises a motor having a roller in frictional contact with the surface of the housing for rotating the housing about an associated one of the axes; a plurality of motor drivers, each motor driver associated with one each of the motors, each motor driver communicating positional information between the controller and the motor driver's associated motor to position the housing about one each of the axes.

15. The apparatus of claim 14, wherein each of the motor drivers comprises a motor driver controller for translating the desired angular position about a rotational axis received from the controller to a signal used to energize the motor driver's associated motor to position the housing about one each of the axes.

16. An apparatus for orienting a payload, comprising a housing having a hollow spherically shaped contour and adapted to enclose the payload; means for rotatably supporting the housing so that the housing can be rotated about at least three orthogonal axes that intersect at a center of rotation within the housing, the supporting means contacting the housing at a plurality of locations forming a circle having a radius such that the distance between the center of mass of the housing and the center of the housing is less than the radius; and computer controlled means for automatically rotating the housing about the at least three orthogonal axes.

17. The apparatus of claim 16, wherein the axes intersect at approximately a center of mass of the housing.

18. The apparatus of claim 17, wherein the supporting means comprises a first supporting member and a second supporting member located diametrically opposite the first supporting member relative to a plane intersecting the center of the housing, the first and second supporting members each having a surface matching the contour of the housing, the first and second supporting members positioned to maintain the housing within the supporting means.

19. The apparatus of claim 16, wherein the axes intersect at approximately a center of mass of the housing when the payload is enclosed in the housing.

20. The apparatus of claim 16, wherein the housing is a partial sphere, and further wherein the supporting structure comprises a supporting member positioned to support the weight of the housing, the supporting member having a surface matching the contour of the housing.

21. A method for orienting a payload in a predetermined direction in three-dimensional space, comprising the steps of mounting the payload in a housing having a spherically-shaped contour; rotatably supporting the housing on a supporting structure having a contour to match the contour of the housing; and, in response to computer control, automatically rotating the housing within the supporting structure about a plurality of orthogonal axes that intersect at approximately the center of the housing.

22. The method of claim 21, wherein the orthogonal axes intersect at approximately the center of mass of the housing and payload combination.

23. The method of claim 22 further comprising the steps of determining a current angular position, receiving a signal representing a desired angular position, and positioning the housing to the desired angular position.

24. An apparatus for positioning a payload, comprising:

a housing having a spherically shaped contour and adapted to enclose a payload;

a supporting structure having a contour to match the contour of the housing in order to rotatably mount the housing; and computer-controlled means for automatically rotating the housing about at least three orthogonal axes that intersect at a point within the housing to orient the housing to a predetermined angular position relative to the point of intersection, the rotation means further comprising an actuator and a drive device associated with each axes, each of the actuator and drive devices further comprising a motor attached to a roller that is in frictional contact with the surface of the housing for rotating the housing about the associated axes.

* * * * *